United States Patent
Hood et al.

(10) Patent No.: US 8,324,287 B2
(45) Date of Patent: Dec. 4, 2012

(54) POSITIVE SKEW STYRENE-ACRYLONITRILE COPOLYMER FOAM

(75) Inventors: Lawrence S. Hood, Midland, MI (US); Stephane Costeux, Midland, MI (US); William A. Heeschen, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 136 days.

(21) Appl. No.: 12/933,173

(22) PCT Filed: Mar. 30, 2009

(86) PCT No.: PCT/US2009/038718
§ 371 (c)(1), (2), (4) Date: Sep. 17, 2010

(87) PCT Pub. No.: WO2009/131795
PCT Pub. Date: Oct. 29, 2009

(65) Prior Publication Data
US 2011/0028577 A1 Feb. 3, 2011

Related U.S. Application Data

(60) Provisional application No. 61/047,765, filed on Apr. 25, 2008.

(51) Int. Cl.
*C08J 9/12* (2006.01)
*C08F 220/44* (2006.01)

(52) U.S. Cl. ............ 521/79; 521/81; 521/139; 521/146; 521/147; 521/82; 264/53; 264/55

(58) Field of Classification Search ...... 521/79
See application file for complete search history.

(56) References Cited

U.S. PATENT DOCUMENTS

| 4,323,528 A | 4/1982 | Collins |
| 4,563,481 A | 1/1986 | Brenner |
| 5,244,927 A | 9/1993 | Binder et al. |
| 5,274,005 A * | 12/1993 | Binder et al. .............. 521/82 |
| 5,280,767 A | 1/1994 | Goetz |
| 6,103,775 A | 8/2000 | Bambara et al. |
| 2010/0292355 A1 * | 11/2010 | Barger et al. .............. 521/81 |

FOREIGN PATENT DOCUMENTS

| DE | 19637366 | 3/1998 |
| EP | 1214372 | 12/2005 |
| EP | 1479717 | 9/2008 |
| JP | 5039323 | 2/1993 |
| WO | 2008030399 | 3/2008 |
| WO | 2008140892 | 11/2008 |

OTHER PUBLICATIONS

Kim, B.K; Ok, Y.S. "Effect of Acrylonitrile Content of Styrene-co-Acrylonitrile (SAN) on Morphology and Electrooptical Properties of Polymer/Liquid Crystal Composite Films". Journal of Applied Polymer Science, vol. 49, 1769-1775 (1993).*
Striegel, A. M., "Determining and correcting "moment bias" in gradient polymer elution chromatography", Journal of Chromatography, Elsevier Science Publishers B. V. Amsterdam, NL, vol. 996, No. 1-2, May 9, 2003, pp. 45-51.

* cited by examiner

*Primary Examiner* — Randy Gulakowski
*Assistant Examiner* — Christina Wales
(74) *Attorney, Agent, or Firm* — Steven W. Mork

(57) ABSTRACT

Prepare a polymeric foam from a foamable polymer composition containing a thermoplastic polymer composition and a blowing agent wherein 75 percent or more by weight of all non-halogenated polymers in the foamable polymer composition is a styrene-acrylonitrile copolymer composition having a polymerized acrylonitrile content distribution with a positive skew in a copolymerized AN content distribution and a positive percent difference between the mean and the median copolymerized AN content distribution.

15 Claims, No Drawings

POSITIVE SKEW STYRENE-ACRYLONITRILE COPOLYMER FOAM

CROSS REFERENCE STATEMENT

This application claims the benefit of U.S. Provisional Application No. 61/047,765, filed Apr. 25, 2008.

BACKGROUND OF THE INVENTION

1. Field of the Invention

The present invention relates to extruded styrene-acrylonitrile polymer foam and a process for preparing such foam.

2. Description of Related Art

Preparing extruded polymer foam that has desirable skin quality is challenging when using water as a blowing agent. Water tends to cause undesirable pinholes (also known as blowholes) that can disrupt a foam surface. Prior art references offer some ways to reduce undesirable effects of an aqueous blowing agent in preparing extruded foam.

PCT publication WO2008140892 discloses that use of a styrene-acrylonitrile (SAN) copolymer having a polydispersity index less than 2.5 in combination with a blowing agent comprising water and a fluorinated compound can produce polymer foam having a good skin quality that is free from blowholes.

U.S. Pat. No. 5,380,767 discloses that increasing the water solubility of a styrenic polymer composition or including an additive into the styrenic polymer composition that enhances the water solubility of the styrenic polymer composition can produce a closed-cell, monomodal foam from the styrenic polymer even with an aqueous blowing agent.

It is desirable to further advance the art of preparing extruded thermoplastic polymer foam using an aqueous blowing agent over these known methods.

BRIEF SUMMARY OF THE INVENTION

Surprisingly, the present inventors have discovered that SAN copolymer compositions characterized having a positive skew in copolymerized acrylonitrile (AN) content distribution, a positive difference between mean and median copolymerized AN content distribution and a mean copolymerized AN content of 20 weight-percent or less produces polymeric foam having less surface defects than a similar polymeric foam (same open-cell content, density and polymer polydispersity index) prepared in a similar manner but with an SAN copolymer composition having characteristics outside these ranges, particularly when using a blowing agent comprising water and especially when made in an extrusion process with a die lip temperature above 100 degrees Celsius. SAN copolymer compositions having a positive skew in the AN content distribution, a positive difference between mean and median copolymerized AN content and a mean copolymerized AN content of 20 wt % or less offer a desirable advantage over other SAN copolymers by allowing the manufacture of polymeric foams having few surface defects using a broader range of die lip temperatures than previously possible. In making this surprising discovery the inventors discovered a surprising trend in ability to make polymeric foam with minimal surface defects even when using a blowing agent comprising water and at higher die lip temperatures by moving the skew in the AN content distribution for the SAN copolymer more positive, with particularly desirable surface quality occurring when the SAN copolymer had a positive skew in AN content distribution.

In a first aspect, the present invention is a polymeric foam comprising a thermoplastic polymer composition having cells defined therein, wherein 75 or more percent by weight of all non-halogenated polymers in the polymeric foam is a styrene-acrylonitrile copolymer composition having a polymerized acrylonitrile content distribution with a positive skew, a positive percent difference between the mean and the median copolymerized AN content distribution, and a mean copolymerized AN content of 20 weight-percent or less.

Desirable embodiments of the first aspect further include one or any combination of more than one of the following characteristics: the styrene-acrylonitrile copolymer composition comprises 0.5 weight-percent or less, based on total styrene-acrylonitrile copolymer composition weight, of styrene-acrylonitrile copolymers having an copolymerized acrylonitrile content of more than 30 weight-percent; the styrene-acrylonitrile copolymer composition accounts for 95 percent by weight or more of all non-halogenated polymers in the thermoplastic polymer composition; having less than 30% open-cell content and a density of 64 kilograms per cubic meter or less; having an average vertical cell size of 0.15 millimeters or more and 0.35 millimeters or less; and the polymeric foam has at least one surface and 80% or more of any 200 square centimeters portion of the surface that is centered on the foam's surface and extending to 80% of the foam's surface dimensions is free of visible defects.

In a second aspect, the present invention is a process for producing a polymeric foam comprising the following steps: (a) Providing a foamable polymer composition at a mixing temperature and a mixing pressure, the foamable polymer composition comprising a thermoplastic polymer composition and a blowing agent; and (b) Exposing the foamable polymer composition to a pressure lower than the mixing pressure and allowing it to expand into a polymeric foam; wherein 75 percent or more by weight of all non-halogenated polymers in the foamable polymer composition is a styrene-acrylonitrile copolymer composition having a polymerized acrylonitrile content distribution with a positive skew in AN content distribution, a positive percent difference between the mean and the median copolymerized AN content distribution, and a mean copolymerized AN content of 20 weight-percent or less.

Desirable embodiments of the second aspect further include one or any combination of more than one of the following characteristics: the styrene-acrylonitrile copolymer composition comprises 0.5 weight-percent or less, based on total styrene-acrylonitrile copolymer composition weight, of styrene-acrylonitrile copolymers having an copolymerized acrylonitrile content of more than 30 weight-percent; the process is an extruded foam process and step (b) comprises expelling the foamable polymer composition through a die into a lower pressure than the mixing pressure and wherein the die has a die lip temperature that is 100 degrees Celsius or higher; the polymeric foam has at least one primary surface and a width and is further characterized by 80% or more of any 200 square-centimeter portion of any primary surface of the foam that is centered on the foam's primary surface and extending to 80% of the foam's width being free of visible defects; die lip temperature is 110 degrees Celsius or higher; the styrene-acrylonitrile copolymer composition accounts for 95 percent by weight or more of all non-halogenated polymers in the polymeric foam; the polymer foam is further characterized by having less than 30% open-cell content and a density of 64 kilograms per cubic meter or less; the polymer foam is further characterized by having an average vertical cell size of 0.15 millimeters or more and 0.35 millimeters or less; the polymeric foam has at least one primary surface and a width and further characterized by 80% or more of any 200 square-centimeter portion of any primary surface of the foam that is centered on the foam's primary surface and that extends to 80% of the foam's width being free of visible defects; and the blowing agent comprises water.

The process of the present invention is useful for preparing foams of the present invention. Foams of the present invention are useful as thermal insulating materials, particularly in the building and construction industry.

DETAILED DESCRIPTION OF THE INVENTION

Terms

"ASTM" means "American Society for Testing and Materials" and is used to designate a particular test method. The hyphenated suffix in the test number identifies the year of the test method. In an absence of such a suffix in the test method number, the test method refers to the most current method prior to the priority date of this document.

"Blowhole" and "Pinhole" are interchangeable and refer to voids the size of multiple cell diameters that are easily observable by the naked eye. Blowhole formation can rupture the surface of foam during foam expansion and thereby cause defects in the foam surface. Blowholes that disrupt a foam surface typically appear as dimples, pits or craters in the foam surface that are generally larger than the average cell size of the foam.

"Acrylonitrile composition" or "AN composition", "polymerized acrylonitrile concentration" and "polymerized AN concentration" are interchangeable and each refers to the amount of copolymerized acrylonitrile in a polymer molecule in weight-percent based on polymer weight.

"Acrylonitrile content distribution", "copolymerized acrylonitrile content distribution", "polymerized acrylonitrile concentration distribution"," "polymerized AN concentration distribution" and "copolymerized AN content" are interchangeable and each refers to a distribution of copolymerized acrylonitrile compositions for a collection of polymers containing acrylonitrile. Illustrate an AN content distribution for a collection of polymers using a plot with the X-axis representing the acrylonitrile (AN) composition in weight-percent and the Y-axis representing weight fraction relative to the collection of polymers.

Determine AN content distribution for an SAN sample composition using gradient liquid adsorption chromatography. Dissolve a sample composition in a solvent blend of 70 volume percent (vol %) dichloromethane and 30 vol % cyclohexane to form a 1.0 percent by weight (wt %) solution of SAN in solvent. Filter the solution using a 0.2 micrometer polytetrafluoroethylene (PTFE) filter (Fischer Scientific). Inject five microliters into a liquid chromatograph (Agilent model 1200 with a diode array detector) to obtain an adsorption fractionation of all components within the sample composition. Use a Luna™ CN column packed with three micrometer particles (Luna is a trademark of Phenomenx, Inc.). Perform elution using a mixture of dichloromethane, acetonitrile and cyclohexane at a flow rate of one milliliter per minute with the initial composition being 100 wt % cyclohexane. Linearly adjust the composition to 83 wt % dichloromethane and 17 wt % acetonitrile over a period of twenty-five minutes. Set the detector to monitor UV absorbance at 260 nanometers with a reference wavelength of 360 nanometers. Obtain a calibration curve to determine copolymerized AN content using eight SAN copolymers having different narrow acrylonitrile compositions that range from 5.3 to 36.9 wt % acrylonitrile. A typical calibration curve equation is:

$$AN_i = -10.24 + 0.0197t + 4.436 \times 10^{-6} t^2$$

where $AN_i$ is the copolymerized acrylonitrile content for elution fraction i in wt % and t is the elusion time for elution fraction i, where wt % is weight-percent relative to the mass of the total polymer sample under analysis.

"Skew", or "skewness", is one measure of asymmetry for a distribution. A distribution having a zero skew is symmetric about its mean (for example, a Gaussian or Normal distribution). A negative skew corresponds to a distribution having a tail, or concentration extending to higher measurable values, on the lower side of the distribution than on the higher side of the distribution causing the distribution to have a larger median than mean. A positive skew corresponds to a distribution having a tail, or concentration extending to higher measurable values, on the higher side of the distribution, which causes the distribution to have a larger mean than median. In the present teachings, copolymers having a positive skew in AN content distribution have a larger mean AN composition than median AN composition. Herein, "skew" or "skewness" refers to skew in AN content distribution of SAN copolymers unless otherwise indicated. A "tail" can include one or more peak in concentration values and is not limited to a continual decline in measurable concentration.

The skew, or skewness, of a distribution can be characterized by a skewness factor (S) defined:

$$S = \kappa_3 / \kappa_2^{3/2}$$

where $\kappa_2$ and $\kappa_3$ are the second and third moments, respectively, about the distribution as defined below:
wherein:

$$\kappa_2 = \sum_i [AN_i - \langle AN \rangle]^2 \Delta w_i \Big/ \sum_i \Delta w_i$$

$$\kappa_3 = \sum_i [AN_i - \langle AN \rangle]^3 \Delta w_i \Big/ \sum_i \Delta w_i$$

$$\langle AN \rangle = \sum_i AN_i \Delta w_i \Big/ \sum_i \Delta w_i$$

and

<AN>=mean sample acrylonitrile composition in percent by weight.

$AN_i$=acrylonitrile composition for elution fraction i in percent by weight.

$\Delta w_i$=area-normalized weight fraction of copolymer in elution fraction i.

where percent by weight is relative to the mass of the total sample weight (that is, weight of polymer sample under analysis).

Another means to measure or characterize skewness or asymmetry of a distribution is by the percent difference between the mean and the median of the distribution. For example, with respect to copolymerized AN content this percent difference (Δ%) is:

$$\Delta \% = ((\langle AN \rangle / AN_0) - 1) \times 100\%$$

where,
<AN>=mean sample composition of acrylonitrile in percent by weight.
$AN_0$=median percent AN by weight, defined as the AN content where 50 wt % of the SAN copolymers have a higher copolymerized AN content and 50 wt % of the SAN copolymers have a lower copolymerized AN content.

A "primary" surface of a foam is a surface of the foam having the greatest planar surface area (area of surface projected onto a plane).

A foam has a "width" dimension that is parallel to the smallest dimension defining a foam's primary surface. If a foam has a square primary surface then the width is parallel to one of the smallest dimensions of the primary surface. For an extruded thermoplastic foam, the width typically lies perpendicular to the extrusion direction of the foam. Extrusion direction is the direction in which the foam traveled out of a foaming die.

A "visible defect" in a foam surface is a discontinuity on the foam surface that is the size of multiple cells and that is visible with an unaided human eye. A "visible defect" can provide direct access to more than one cell of the foam through the foam surface. Defects are apparent directly upon foam formation and typically have an irregular shape (for example, non-symmetrically shaped circumference). Defects are distinct from intentionally milled grooves or slices introduced into a foam after foam formation, which typically have a regular shape. As an example, a blowhole that ruptures a surface can be a visible defect.

A foam qualifies as having a "high quality foam surface" if 80% or more of any 200 square centimeters portion of a surface of the foam that is centered on the foam surface and extending to 80% of the dimensions of the foam surface (for example, width and length for a primary surface) is free of visible defects. Centering the portion of foam surface on the foam surface is to avoid edges of the foam from being included in the evaluation. Measure the extent of defect-free area on a primary surface of the foam samples using "ImageJ" software, which is publicly available from the National Institute of Health (available, for example, at the Internet website http://rsb.info.nih.gov/ij/). Use "glancing" (that is, low angle of incidence) illumination of the foam sample to highlight surface imperfections. Collect images using a Dage MTI CCD-72 with a Nikon 20 mm lens. Analyze the image for the fraction of the surface that is free from surface imperfections. This measurement method minimizes human error in measuring visible defects on the foam sample surfaces.

"Die lip temperature" refers to the temperature of a portion of an extrusion die where a foamable composition last contacts the die as it exits the die. The die lip of an extrusion die is the last portion of the die that a foamable polymer composition contacts prior to exiting the extrusion die. Die lips are heated with a recirculation flow of hot oil. The die lip temperature is the temperature of the oil exiting the die. Desirably, the foamable composition extruded through a die has a surface temperature equal to the die lip temperature upon exiting the die.

Process

The process of the present invention requires providing a foamable polymer composition comprising a thermoplastic polymer composition and a blowing agent. 75 percent or more by weight (wt %), preferably 90 wt % or more, still more preferably 95 wt % or more and conceivably 100 wt % of all non-halogenated polymers in the foamable polymer composition is a styrene-acrylonitrile (SAN) copolymer composition having a copolymerized acrylonitrile (AN) distribution with a positive skew, a positive percent difference between the mean and the median copolymerized AN content distribution, and a mean copolymerized AN content of 20 weight-percent or less. This is an unusual SAN composition. While SAN polymers are commercially available having a positive skew and even a positive percent difference between the mean and the median copolymerized AN content distribution, the present inventors have been unable to find any of those that have a mean copolymerized AN content of 20% or less. Yet it is such a polymer that the inventors have discovered is necessary in the present process to produce the foam of the present invention—an SAN foam having a density of 64 kilograms per cubic meter or less, an average cell size of 0.15 millimeters or more and one millimeter or less, and a good skin quality.

For reference purposes, Table 1 provides characteristics of commercially available SAN copolymers that were available at the time of experimentation for the present invention.

The SAN copolymer composition consists of one or more than one type of SAN copolymer. SAN copolymer in the SAN copolymer composition can be block copolymer, a random copolymer, linear, branched or any combination of such types of SAN copolymers. Polymerized AN components desirably make up 25 percent by weight (wt %) or less, typically 20 wt % or less, more typically 15 wt % or less based on the total weight of SAN copolymer composition. Moreover, polymerized AN components desirably make up five wt % or more, preferably ten wt % or more based on the total weight of SAN copolymer composition.

The SAN copolymer composition desirably contains little to no SAN copolymer containing more than 30 wt % AN content. Copolymers having high levels of AN increase the viscosity of the copolymer composition, which detrimentally results in greater processing pressure drop during foaming Foamed articles with large cross sectional areas are more difficult to prepare when a high processing pressure drop is present. Desirably, the SAN copolymer composition of the present invention comprises less than 0.5 wt %, preferably 0.2 wt % or less, still more preferably 0.1 wt % or less and most desirably 0 wt % of SAN copolymers having an AN content greater than 30 wt %.

The SAN copolymer composition has a polymerized AN distribution with a positive skew. That means the polymerized AN distribution skew is greater than zero and is desirably 0.1 or higher, preferably 0.5 or higher. Typically, the polymerized AN distribution has a skew that is three or less.

The SAN copolymer desirably has a percent difference between the mean and the median AN composition that is positive, preferably that is one percent (%) or more. The SAN copolymer also typically has a percent difference between the mean and the median AN composition that is five % or less, preferably four % or less, and can be two % or less.

The thermoplastic polymer composition can contain additional thermoplastic polymers in addition to the SAN copolymer composition, or may be free of polymers other than the SAN copolymer composition. Additional thermoplastic polymers can include any one or any combination of the following: styrenic polymers and copolymers, ethylene polymers and copolymers, and fluoroelastomers.

Suitable blowing agents include any one or any combination of more than one of the following: inorganic gases such as carbon dioxide, argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1,-difluoroethane (HFC-152a), 1,1,1-trifluoroethane (HFC- 143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

Desirably, the blowing agent is an aqueous blowing agent, which means it contains water. Desirably the blowing agent contains 0.5 weight parts or more, preferably 0.8 weight parts or more or water based on 100 weight parts thermoplastic polymer composition.

The foamable polymer composition may further comprise an additive including one or more than one additive selected from: infrared attenuating agents (for example, carbon black, graphite, metal flake, titanium dioxide); clays such as natural absorbent clays (for example, kaolinite and montmorillonite) and synthetic clays; nucleating agents (for example, talc and magnesium silicate); flame retardants (for example, brominated flame retardants such as hexabromocyclododecane and brominated polymers and copolymers, phosphorous flame retardants such as triphenylphosphate, and flame retardant packages that may including synergists such as, for example, dicumyl and polycumyl); lubricants (for example, calcium stearate and barium stearate); and acid scavengers (for example, magnesium oxide and tetrasodium pyrophosphate). A preferred flame retardant package includes a combination of hexahalocyclododecane (for example, hexabromocyclododecane) and tetrabromobisphenol-A bis (2,3-dibromopropyl ether).

Provide the foamable polymer composition at a mixing temperature and mixing pressure and then allow for foaming by exposing the foamable polymer composition to a foaming pressure that is lower than the mixing pressure and allowing the foamable polymer composition to expand into a polymeric foam. The mixing temperature is at or above the softening temperature of the polymer composition, a temperature where the thermoplastic polymer composition is malleable and expandable under the pressure of the blowing agent when exposed to the foaming pressure. The mixing pressure is sufficiently high to preclude observable (with an unaided eye) foaming of the foamable polymer composition. The foaming pressure is lower than the mixing pressure and sufficiently low to allow the foamable polymer composition to expand under the pressure of the foaming agent. Typically, the foaming pressure is atmospheric pressure.

In its broadest scope, the process of the present invention includes batch processes (such as expanded bead foam processes), semi-batch processes (such as accumulative extrusion processes) and continuous processes such as continuous extrusion foam processes. Desirably, the process is a semi-batch or continuous extrusion process. Most preferably the process is an extrusion process.

An expanded bead foam process is a batch process that requires preparing a foamable polymer composition by incorporating a blowing agent into granules of polymer composition (for example, imbibing granules of thermoplastic polymer composition with a blowing agent under pressure). Each bead becomes a foamable polymer composition. Often, though not necessarily, the foamable beads undergo at least two expansion steps. An initial expansion occurs by heating the granules above their softening temperature and allowing the blowing agent to expand the beads. A second expansion is often done with multiple beads in a mold and then exposing the beads to steam to further expand them and fuse them together. A bonding agent is commonly coated on the beads before the second expansion to facilitate bonding of the beads together. The resulting expanded bead foam has a characteristic continuous network of polymer skins throughout the foam. The polymer skin network corresponds to the surface of each individual bead and encompasses groups of cells throughout the foam. The network is of higher density than the portion of foam containing groups of cells that the network encompasses. Accumulative extrusion and extrusion processes produce foams that are free of such a polymer skin network.

Accumulative extrusion is a semi-continuous extrusion process that comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone having a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam. U.S. Pat. No. 4,323,528, herein incorporated by reference, discloses such a process in a context of making polyolefin foams, yet which is readily adaptable to aromatic polymer foam.

In a general extrusion process, prepare a foamable polymer composition of a thermoplastic polymer with a blowing agent in an extruder by heating a thermoplastic polymer composition to soften it, mixing a blowing agent composition together with the softened thermoplastic polymer composition at a mixing temperature and mixing pressure that precludes observable expansion of the blowing agent to any meaningful extent (preferably, that precludes any blowing agent expansion) and then expelling the foamable polymer composition through a die into an environment having a temperature and pressure below the mixing temperature and pressure. Upon expelling the foamable polymer composition into the lower pressure the blowing agent expands the thermoplastic polymer into a thermoplastic polymer foam. Desirably, cool the foamable polymer composition after mixing and prior to expelling it through the die. In a continuous process, expel the foamable polymer composition at an essentially constant rate into the lower pressure to enable essentially continuous foaming.

One of the unexpected advantages the present thermoplastic polymer composition provides is that it allows preparation of extruded thermoplastic polymer foam having a high quality foam surface, preferably a high quality primary surface when using an aqueous blowing agent over a broader range of die lip temperatures than otherwise possible, particularly at higher die lip temperature than otherwise possible. For example, polymeric foam having a high quality foam surface is possible in an extrusion process of the present invention using die lip temperatures of 100 degrees Celsius (° C.) or higher, even 105° C. or higher, even 110° C. or higher. As a result, a broader processing window is accessible, which improves the ability of an operator to produce high quality foam product despite variation in the control of die lip temperatures and to increase production rates.

Desirably, the process of the present invention produces a foam having a cross sectional area of at least 50 cm$^2$, preferably 75 cm$^2$ or more, still more preferably 100 cm$^2$ or more.

Foam

The process of the present invention produces a polymeric foam of the present invention. In its broadest scope, the polymeric foam of the present invention comprises a thermoplastic polymer composition having cells defined therein wherein the thermoplastic polymer composition is as described for the process of the present invention, including the various embodiments of the thermoplastic polymer composition as described for the process of the present invention. The polymeric foam of the present invention desirably has a high quality foam surface.

The polymeric foam desirably has a density of 64 kilograms per cubic meter (kg/m$^3$) or less, more preferably 48 kg/m$^3$ or less, still more preferably 35 kg/m$^3$ or less and can have a density of 30 kg/m$^3$ or less. Determine foam density according to ASTM method D-1622-03.

The polymeric foam can be open celled or close celled, but is preferably close celled. An open celled foam has an open cell content of 30% or more based on ASTM method D6226-05. A closed cell foam has an open cell content of less than 30% based on ASTM method D6226-05. Desirably, the foam of the present invention has an open cell content of 20% or less, preferably 10% or less, more preferably 5% or less, still more preferably 1% or less and can have an open cell content of 0% according to ASTM method 6226-05.

The cells of the polymeric foam desirably have an average cell size, or average vertical cell size, of 0.15 millimeters or more and one millimeter or less, preferably 0.5 millimeters or less, more preferably 0.35 millimeters or less according to ASTM method D-3576-04. The polymeric foam can have a multimodal (including bimodal) or monomodal cell size distribution. Vertical cell size refers to the dimension of the cell in a vertical direction. The vertical direction corresponds to a foam's thickness dimension, which is perpendicular to a primary surface of the foam.

The polymeric foam may contain an additive similar to the foamable polymer composition. For example, the polymeric foam may contain one or more than one additive selected from: infrared attenuating agents (for example, carbon black, graphite, metal flake, titanium dioxide); clays such as natural absorbent clays (for example, kaolinite and montmorillonite) and synthetic clays; nucleating agents (for example, talc and magnesium silicate); flame retardants (for example, brominated flame retardants such as hexabromocyclododecane and brominated polymers and copolymers, phosphorous flame retardants such as triphenylphosphate, and flame retardant packages that may including synergists such as, for example, dicumyl and polycumyl); lubricants (for example, calcium stearate and barium stearate); and acid scavengers (for example, magnesium oxide and tetrasodium pyrophosphate). A preferred flame retardant package includes a combination of hexahalocyclododecane (for example, hexabromocyclododecane) and tetrabromobisphenol A bis (2,3-dibromopropyl)ether.

Polymeric foams of the present invention are particularly useful as thermal insulating materials. For example, placing a polymeric foam of the present invention between two environments that differ in temperature serves to help thermally insulate one environment from the other. The polymeric foams may also serve as acoustical attenuators.

EXAMPLES

The following examples serve to illustrate embodiments of the present invention. Herein, "pph" refers to weight parts per hundred weight parts polymer composition unless otherwise stated.

Prepare foam samples from resins as characterized in Table 2. Feed one of the polymer resins at 200 pounds per hour into an extruder at a mixing temperature of approximately 200° C. to form a polymer melt. Add to the melt the following additives: 0.15 pph barium stearate, 0.3 pph linear low density polyethylene (DOWLEX® brand polyethylene; DOWLEX is a trademark of The Dow Chemical Company), 0.2 pph talc (MISTRON® Vapor-R talc, MISTRON is a trademark of Luzenac America Inc., Corporation) and 0.90 pph of flame retardant (SAYTEX® HP-900, SAYTEX is a trademark of Albemarle Corp.), 0.03 pph thermal stabilizer (THERM-CHEK® 832, THERM-CHEK is a trademark of Ferro Corp.), 0.02 pph NAUGARD® XL-1 antioxidant (NAUGARD is a trademark of Chemtura Corn).

TABLE 1

| Property | units | Resin 1 | Resin 2 | Resin 3 |
| --- | --- | --- | --- | --- |
| Weight-average molecular weight (Mw) | grams per mol | 128750 | 130500 | 134567 |
| Number average molecular weight (Mn) | grams per mol | 54850 | 55850 | 57400 |
| Polydispersity Index (Mw/Mn) | | 2.35 | 2.34 | 2.34 |
| Resin component with Mw < 25,000 | wt % | 9.05 | 8.7 | 8.33 |
| Resin component with Mw > 1,000,000 | wt % | 0 | 0 | 0 |
| Median % AN ($AN_0$) | wt % | 15.5 | 16.0 | 16.2 |
| Mean % AN <AN> | wt % | 15.1 | 15.9 | 16.8 |
| Δ % | % | −2.8 | 0.3 | 3.7 |
| Skewness | | −1.30 | −0.42 | 0.89 |
| SAN with > 30 wt % AN | wt % of all SAN | 0.0 | 0.0 | 0.0 |

Add to the polymer melt while in the extruder the following blowing agents at the following concentrations: 7.5 pph 1,1,1,2-tetrafluoroethane (HFC-134a); 1.2 pph carbon dioxide and 0.9 pph water to form a foamable polymer composition. Cool the foamable composition to a foaming temperature of 130° C. and expel the foamable mixture through a slit die into atmospheric pressure. Prepare foams using three different die lip temperatures: 90° C., 100° C. and 110° C. The resulting foams are foam samples that serve as Comparative Examples or Examples of the present invention, depending on the polymer resin.

Determine foam density according to the procedure set forth in ASTM method D-1622-03.

Determine average vertical cell size according to the procedure set forth in ASTM method D-3576-04.

Determine open cell content according to the procedure set forth in ASTM method D6226-05.

Comparative Example A

Resin 1

Prepare Comparative Example A samples using Resin 1. Prepare Comparative Example A(i) using 90° C. die lip temperature, Comparative Example A(ii) using a 100° C. die lip temperature and Comparative Example A(iii) using a 110° C. die lip temperature. Table 2 presents properties for the Comparative Example A samples.

TABLE 2

| Comparative Example | Units | A(i) | A(ii) | A(iii) |
|---|---|---|---|---|
| Die Lip Temperature | (° C.) | 90 | 100 | 110 |
| Density (with skins) | (kg/m$^3$) | 32.5 | 33.5 | 32.7 |
| Average Vertical Cell Size | (mm) | 0.24 | 0.27 | 0.24 |
| Cross Sectional Area | (cm$^2$) | 76.8 | 74.2 | 79.4 |
| Open Cell | % | 0 | 1.1 | 2.8 |
| High Quality Foam Surface | Yes (Y) or No (N) | Y | Y | N |

Each of the Comparative Example A samples has a monomodal cell size distribution. The Comparative Example A samples prepared at 90° C. and 100° C. die lip temperature also have a high quality foam surface. However, the Comparative Example A sample prepared at 110° C. does not have a high quality foam surface.

Comparative Example B

Resin 2

Prepare Comparative Example B using Resin 2. Prepare Comparative Example B(i) using 90° C. die lip temperature, Comparative Example B(ii) using a 100° C. die lip temperature and Comparative Example B(iii) using a 110° C. die lip temperature. Table 3 presents properties for the Comparative Example B samples.

TABLE 3

| Comparative Example | Units | B(i) | B(ii) | B(iii) |
|---|---|---|---|---|
| Die Lip Temperature | (° C.) | 90 | 100 | 110 |
| Density (with skins) | (kg/m$^2$) | 33.6 | 34.4 | 32.8 |
| Average Vertical Cell Size | (mm) | 0.24 | 0.24 | 0.24 |
| Cross Sectional Area | (cm$^2$) | 75.5 | 73.5 | 84.5 |
| Open Cell | % | 1.1 | 0.8 | 2.9 |
| High Quality Foam Surface | Yes (Y) or No (N) | Y | Y | N |

Each of the Comparative Example B samples has a monomodal cell size distribution. The Comparative Example B samples prepared at 90° C. and 100° C. die lip temperature also have a high quality foam surface. However, the Comparative Example B sample prepared at 110° C. does not have a high quality foam surface. Comparative Example B(iii) is closer to qualifying as having a high quality foam surface than Comparative Example A(iii), illustrating that increasing skew value in the SAN resin tends to improve skin quality, but that a high quality skin quality is still not achieved using a die lip temperature of 110° C.

Example 1

Resin 3

Prepare Example 1 using Resin 3. Prepare Example B1(i) using 90° C. die lip temperature, Example 1(ii) using a 100° C. die lip temperature and Example 1(iii) using a 110° C. die lip temperature. Table 4 presents properties for the Example 1 samples.

TABLE 4

| Example 1 | Units | 1(i) | 1(ii) | 1(iii) |
|---|---|---|---|---|
| Die Lip Temperature | (° C.) | 90 | 100 | 110 |
| Density (with skins) | (kg/m$^2$) | 33.5 | 34.0 | 33.6 |
| Average Vertical Cell Size | (mm) | 0.26 | 0.28 | 0.28 |
| Cross Sectional Area | (cm$^2$) | 74.2 | 77.4 | 78.1 |
| Open Cell | % | 0.6 | 0.3 | 2.6 |
| High Quality Foam Surface | Yes (Y) or No (N) | Y | Y | Y |

Each of the Example 1 samples has a monomodal cell size distribution and each qualify as having a high quality foam surface—even having been prepared with a die lip temperature of 110° C.

Blend Examples

Suitable SAN copolymer compositions can be blends of individual SAN copolymers, even blends with SAN copolymers that fall outside the scope of a suitable SAN copolymer composition provided the blend qualifies as a suitable SAN copolymer composition.

Table 5 identifies six SAN copolymer resins. The blend examples comprise two or more of these six copolymer resins. Table 6 describes the SAN copolymer compositions for the blend examples in terms of weight-percent of each resin based on total SAN copolymer composition weight and in terms of AN composition characteristics.

TABLE 5

| Property | Units | Resin 4 | Resin 5 | Resin 6 | Resin 7 | Resin 8 | Resin 9 |
|---|---|---|---|---|---|---|---|
| Weight-average molecular weight (Mw) | grams per mol | 122000 | 145000 | 129000 | 140000 | 117000 | 125000 |
| Number average molecular weight (Mn) | grams per mol | 53400 | 65800 | 57000 | 61000 | 51000 | 54000 |
| Polydispersity Index (Mw/Mn) | | 2.28 | 2.21 | 2.27 | 2.28 | 2.29 | 2.32 |
| Median % AN (AN$_0$) | Wt % | 15.6 | 15.9 | 15.9 | 11.1 | 20.4 | 18.0 |

TABLE 5-continued

| Property | Units | Resin 4 | Resin 5 | Resin 6 | Resin 7 | Resin 8 | Resin 9 |
|---|---|---|---|---|---|---|---|
| Mean % AN $\langle AN \rangle$ | Wt % | 15.6 | 16.0 | 15.8 | 11.0 | 20.3 | 18.0 |
| Δ % | % | 0.1 | 0.7 | −0.2 | −0.35 | −0.26 | 0.02 |
| Skewness | | 0.28 | 1.06 | 0.34 | −0.99 | −0.44 | 0.15 |

TABLE 6

| Resin | Example 2 composition (wt %) | Example 3 composition (wt %) | Example 4 composition (wt %) | Example 5 composition (wt %) |
|---|---|---|---|---|
| 4 | | | | 40 |
| 5 | | | | 40 |
| 6 | 60 | 60 | 20 | |
| 7 | 20 | | 80 | |
| 8 | 20 | 10 | | 20 |
| 9 | | 30 | | |
| Median % AN (AN$_0$) | 15.80 | 16.40 | 11.37 | 15.81 |
| Mean % AN $\langle AN \rangle$ | 15.84 | 16.91 | 12.02 | 16.58 |
| Δ % | 0.24 | 3.13 | 5.69 | 4.84 |
| Skewness | 0.26 | 0.51 | 0.82 | 1.10 |
| wt % SAN with > 30 wt % AN | 0.1 | 0.0 | 0.0 | 0.1 |

Prepare Examples 2-5 in like manner as the previous foam samples, with three foams for each Example designated with suffix (i) for a die lip temperature of 90° C., (ii) for a die lip temperature of 100° C. and (iii) for a die lip temperature of 110° C. Table 7 presents the characteristics for each of the foams of Examples 2-5.

TABLE 7

| Foam | Die Lip Temperature (° C.) | Density (with skins) (kg/m$^3$) | Ave Cell Size (mm) | Cross Sectional Area (cm$^2$) | Open Cell Content (%) | High Quality Foam Surface (Yes/No) |
|---|---|---|---|---|---|---|
| 2(i) | 90 | 30.6 | 0.24 | 73.3 | 3.9 | Y |
| 2(ii) | 100 | 30.9 | 0.23 | 72.9 | 4.0 | Y |
| 2(iii) | 110 | 30.8 | 0.22 | 75.5 | 4.5 | Y |
| 3(i) | 90 | 31.4 | 0.24 | 79.0 | 3.6 | Y |
| 3(ii) | 100 | 31.1 | 0.24 | 78.6 | 4.4 | Y |
| 3(iii) | 110 | 31.1 | 0.27 | 76.3 | 4.3 | Y |
| 4(i) | 90 | 32.4 | 0.22 | 77.3 | 4.4 | Y |
| 4(ii) | 100 | 31.9 | 0.24 | 75.5 | 4.7 | Y |
| 4(iii) | 110 | 31.6 | 0.24 | 78.6 | 4.4 | Y |
| 5(i) | 90 | 30.6 | 0.28 | 82.5 | 3.3 | Y |
| 5(ii) | 100 | 30.6 | 0.28 | 82.9 | 2.0 | Y |
| 5(iii) | 110 | 30.4 | 0.30 | 80.1 | 2.8 | Y |

Each of Examples 2-5 have a monomodal cell size distribution and surprisingly reveal a high quality foam surface even when using a die lip temperature of 110° C.

The Comparative Examples and Examples illustrate that by increasing the positive aspect of the SAN copolymer skew in AN content distribution larger portions of the foam sample primary surface is defect-free. Examples 1-5 further illustrate that by using a SAN copolymer composition having a positive skew in AN content distribution allows for manufacturing of a polymeric foam having a high quality foam surface even using a die lip temperature above 100° C., even at a die lip temperature of 110° C. Example 1 illustrates this surprising result with a single SAN in the SAN copolymer composition. Examples 2-5 illustrate this surprising result with a blend of SANs making up the SAN copolymer composition.

The invention claimed is:

1. A polymeric foam comprising a thermoplastic polymer composition having cells defined therein, wherein 75 or more percent by weight of all non-halogenated polymers in the polymeric foam is a styrene-acrylonitrile copolymer composition having a polymerized acrylonitrile content distribution with a positive skew, a positive percent difference between the mean and the median copolymerized AN content distribution, and a mean copolymerized AN content of 20 weight-percent or less.

2. The polymeric foam of claim 1, wherein the styrene-acrylonitrile copolymer composition comprises 0.5 weight-percent or less, based on total styrene-acrylonitrile copolymer composition weight, of styrene-acrylonitrile copolymers having an copolymerized acrylonitrile content of more than 30 weight-percent.

3. The polymeric foam of claim 1, wherein the styrene-acrylonitrile copolymer composition accounts for 95 percent by weight or more of all non-halogenated polymers in the thermoplastic polymer composition.

4. The polymeric foam of claim 1, further characterized by having less than 30% open-cell content and a density of 64 kilograms per cubic meter or less.

5. The polymeric foam of claim 4, further characterized by having an average vertical cell size of 0.15 millimeters or more and 0.35 millimeters or less.

6. The polymeric foam of claim 1, wherein the polymeric foam has at least one surface and 80% or more of any 200 square centimeters portion of the surface that is centered on the foam's surface and extending to 80% of the foam's surface dimensions is free of visible defects.

7. A process for producing a polymeric foam comprising the following steps:
   a. Providing a foamable polymer composition at a mixing temperature and a mixing pressure, the foamable polymer composition comprising a thermoplastic polymer composition and a blowing agent that comprises water; and b. Exposing the foamable polymer composition to a pressure lower than the mixing pressure and allowing it to expand into a polymeric foam;

wherein 75 percent or more by weight of all non-halogenated polymers in the foamable polymer composition is a styrene-acrylonitrile copolymer composition having a polymerized acrylonitrile content distribution with a positive skew in AN content distribution, a positive percent difference between the mean and the median copolymerized AN content distribution, and a mean copolymerized AN content of 20 weight-percent or less.

8. The process of claim 7, wherein the styrene-acrylonitrile copolymer composition comprises 0.5 weight-percent or less, based on total styrene-acrylonitrile copolymer composition weight, of styrene-acrylonitrile copolymers having an copolymerized acrylonitrile content of more than 30 weight-percent.

9. The process of claim 7, wherein the process is an extruded foam process and step (b) comprises expelling the foamable polymer composition through a die into a lower pressure than the mixing pressure and wherein the die has a die lip temperature that is 100 degrees Celsius or higher.

10. The process of claim 9, wherein the polymeric foam has at least one primary surface and a width and is further characterized by 80% or more of any 200 square-centimeter portion of any primary surface of the foam that is centered on the foam's primary surface and extending to 80% of the foam's width being free of visible defects.

11. The process of claim 9, wherein the die lip temperature is 110 degrees Celsius or higher.

12. The process of claim 7, wherein the styrene-acrylonitrile copolymer composition accounts for 95 percent by weight or more of all non-halogenated polymers in the polymeric foam.

13. The process of claim 7, wherein the polymer foam is further characterized by having less than 30% open-cell content and a density of 64 kilograms per cubic meter or less.

14. The process of claim 13, wherein the polymer foam is further characterized by having an average vertical cell size of 0.15 millimeters or more and 0.35 millimeters or less.

15. The process of claim 7, wherein the polymeric foam has at least one primary surface and a width and further characterized by 80% or more of any 200 square-centimeter portion of any primary surface of the foam that is centered on the foam's primary surface and that extends to 80% of the foam's width being free of visible defects.

* * * * *